(12) United States Patent
Zhang et al.

(10) Patent No.: US 11,754,715 B2
(45) Date of Patent: Sep. 12, 2023

(54) POINT CLOUD FORMAT OPTIMIZED FOR LIDAR DATA STORAGE BASED ON DEVICE PROPERTY

(71) Applicant: Baidu USA LLC, Sunnyvale, CA (US)

(72) Inventors: Manjiang Zhang, Sunnyvale, CA (US); Min Guo, Sunnyvale, CA (US); Shengjin Zhou, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 919 days.

(21) Appl. No.: 16/509,444

(22) Filed: Jul. 11, 2019

(65) Prior Publication Data

US 2021/0011163 A1    Jan. 14, 2021

(51) Int. Cl.
  *G01S 17/89* (2020.01)
  *G01S 17/931* (2020.01)
  *G01S 7/48* (2006.01)

(52) U.S. Cl.
  CPC ............ *G01S 17/89* (2013.01); *G01S 7/4808* (2013.01); *G01S 17/931* (2020.01)

(58) Field of Classification Search
  CPC ...... G01S 17/89; G01S 17/931; G01S 7/4808; G01S 7/497; G01S 13/865
  See application file for complete search history.

(56) References Cited

U.S. PATENT DOCUMENTS

| | | | | |
|---|---|---|---|---|
| 10,508,986 B1 * | 12/2019 | Zhu | ...................... | G05D 1/0088 |
| 11,275,673 B1 * | 3/2022 | Dolan | .................. | G06F 11/3664 |
| 2016/0035081 A1 * | 2/2016 | Stout | ...................... | G06V 20/58 |
| | | | | 382/103 |
| 2019/0041523 A1 * | 2/2019 | Muramatsu | ............. | G01S 17/89 |
| 2019/0120946 A1 * | 4/2019 | Wheeler | ............... | H04N 13/106 |
| 2019/0188899 A1 * | 6/2019 | Moloney | ................ | G06V 20/13 |
| 2019/0306284 A1 * | 10/2019 | Fu | ........................... | H04L 69/22 |
| 2019/0311546 A1 * | 10/2019 | Tay | ....................... | G05D 1/0088 |
| 2019/0369241 A1 * | 12/2019 | Chen | ...................... | G03B 13/20 |
| 2019/0371052 A1 * | 12/2019 | Kehl | ........................ | G06T 7/521 |
| 2020/0142032 A1 * | 5/2020 | Chen | ..................... | G01S 7/4802 |
| 2020/0158514 A1 * | 5/2020 | Moloney | ................. | G06V 20/64 |

* cited by examiner

*Primary Examiner* — John W Miller
*Assistant Examiner* — Sean N. Haiem
(74) *Attorney, Agent, or Firm* — WOMBLE BOND DICKINSON (US) LLP

(57) ABSTRACT

In one embodiment, an exemplary computer-implemented method of storing point cloud data in an autonomous driving vehicle can include the operations of receiving raw point cloud data from a LiDAR sensor mounted on the autonomous driving vehicle, the raw point cloud data representing cloud data points acquired in response to laser beams emitted at a given angle; retrieving configuration information of the LiDAR sensor, the configuration information including at least a number of laser lines of the LiDAR sensor. The method further includes the operations of constructing, based on the configuration information, a data structure that includes a data entry for each of the cloud data points, the data entry including multiple fields for storing attributes of the cloud data point, each field having a bit width determined based on the configuration information using a predetermined algorithm; and writing the cloud data points to a storage medium using the data structure.

20 Claims, 12 Drawing Sheets

POINT CLOUD FORMAT OPTIMIZED FOR LIDAR DATA STORAGE BASED ON DEVICE PROPERTY

TECHNICAL FIELD

Embodiments of the present disclosure relate generally to autonomous vehicles. More particularly, embodiments of the disclosure relate to storage of point cloud data in an autonomous driving vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Light detection and ranging (LiDAR) sensors are important onboard sensors, and are increasingly used in autonomous driving vehicles. A LiDAR sensor can generate large amounts of data, which needs to be stored efficiently to avoid a waste of precious storage spaces in an autonomous driving vehicle. Point cloud data typically are stored in one of a number of point cloud data (PCL) formats. However, the point cloud data stored in such a format tends to have a large size.

Previous attempts to reduce the size of point cloud data include using lossless or lossy algorithms. These algorithms are not only expensive to implement in hardware, but also fail to take into account properties of sensor hardware. As such, such algorithms may provide unneeded data storage accuracy, which leads to a waste of precious storage spaces in an autonomous driving vehicle.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
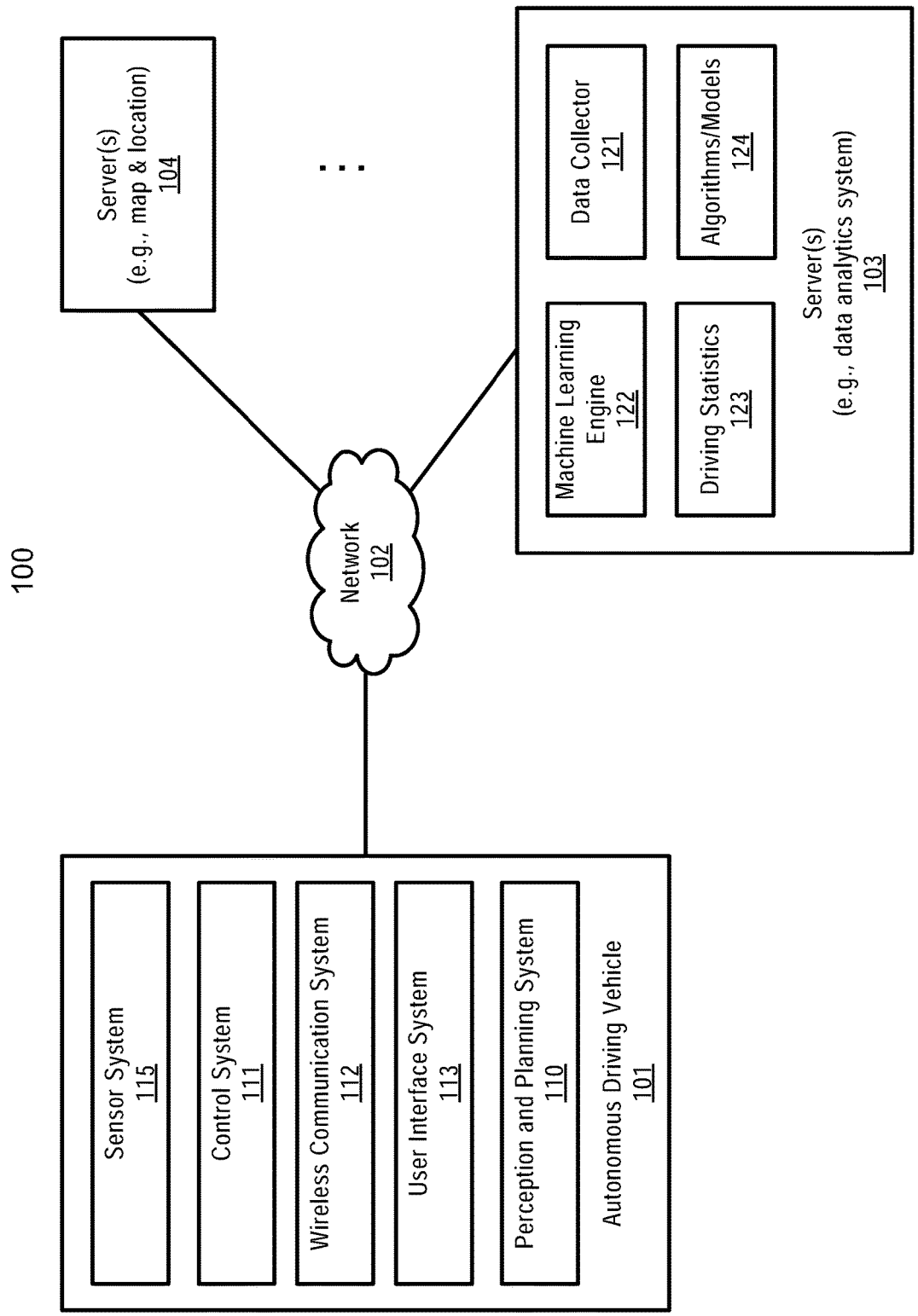
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

In one embodiment, an exemplary computer-implemented method of storing point cloud data in an autonomous driving vehicle can include the operations of receiving raw point cloud data from a LiDAR sensor mounted on the autonomous driving vehicle, the raw point cloud data representing cloud data points acquired in response to laser beams emitted at a given angle; retrieving configuration information of the LiDAR sensor, the configuration information including at least a number of laser lines of the LiDAR sensor. The method further includes the operations of constructing, based on the configuration information, a data structure that includes a data entry for each of the cloud data points, the data entry including multiple fields for storing attributes of the cloud data point, each field having a bit width determined based on the configuration information using a predetermined algorithm; and writing the cloud data points to a storage medium using the data structure.

In one embodiment, the data structure can be a user-defined storage format, which uses flexible bitwise vectors to store raw point cloud data from a LiDAR sensor mounted on an autonomous driving vehicle. Each vector can include multiple data segments for storing attributes of cloud data points. Each data segment can store attributes of one cloud data point. The vector can also include a metadata segment, which stores common information to be shared by the data segments in the vector.

In one embodiment, the size of the vector depends on hardware property properties of the LiDAR sensor, e.g., measurement accuracy, and minimum and maximum measurement distances. Bit widths of one or more fields in each data segment can be dynamically adjusted based on hardware properties of the LiDAR sensor.

A hardware processing unit can be programmed to read hardware properties of the LiDAR sensor, and create a vector with a size determined based on the hardware properties. Bit widths of some fields in each data segment in the vector can also be determined based on the hardware properties. The hardware processing unit can store attributes of cloud data points in the vector, and stores the vector in a storage medium. When the stored cloud data points are needed by other functions of the autonomous driving vehicle, the hardware processing unit can retrieve the stored cloud data points and convert it into a standard point cloud data format.

In one embodiment, the common information stored in the metadata segment in a vector can include base data for one or more fields of each data segment in the vector. For example, a base time can be stored in the metadata segment to be shared by each data segment in the vector. Each data segment in the vector can just store an offset time for the corresponding cloud data point. The offset time can be used together with the base time to derive an actual acquisition timestamp of the corresponding cloud data point.

In one embodiment, bit level optimization can be applied to fields in each data segment to reduce storage space. The bit width of one or more fields in each data segment can be inversely proportional to the number of the laser lines of the LiDAR sensor. The larger the number of laser lines for a LiDAR sensor, the narrower the bit widths of some fields used to store attribute of a cloud data point of the LiDAR sensor.

Autonomous Driving Vehicle

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
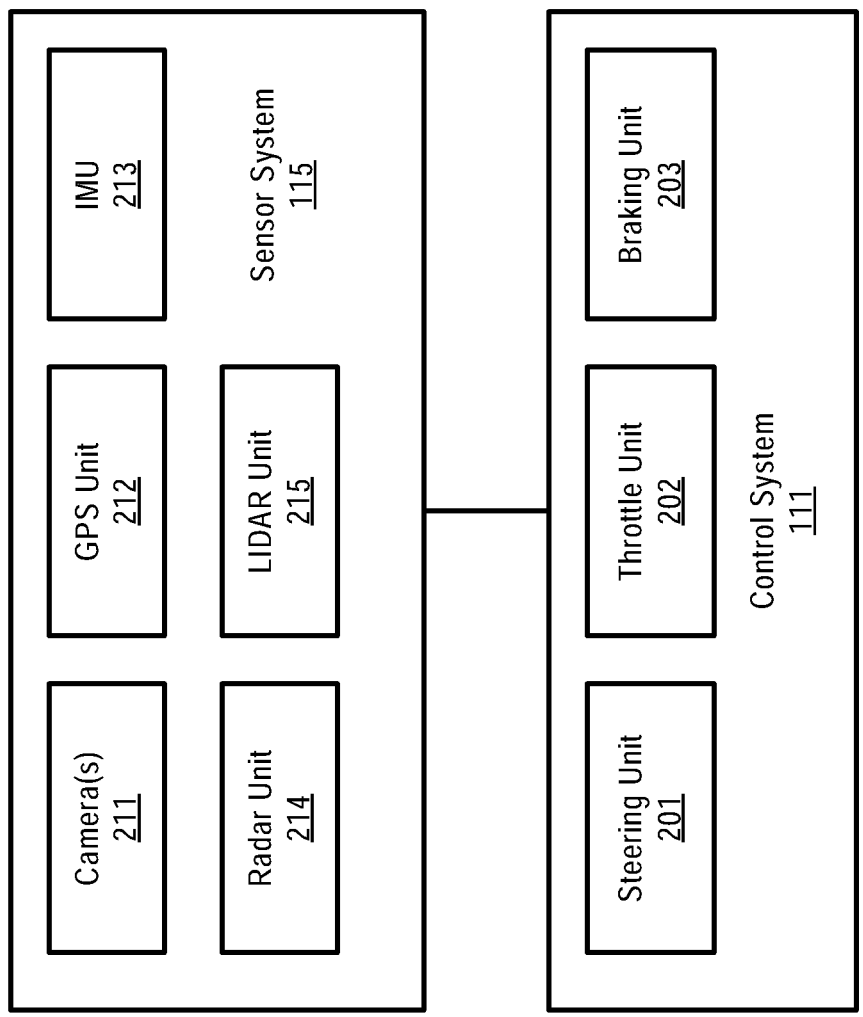
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. Algorithms 124 can then be uploaded on ADVs to be utilized during autonomous driving in real-time.

Figure 3A:
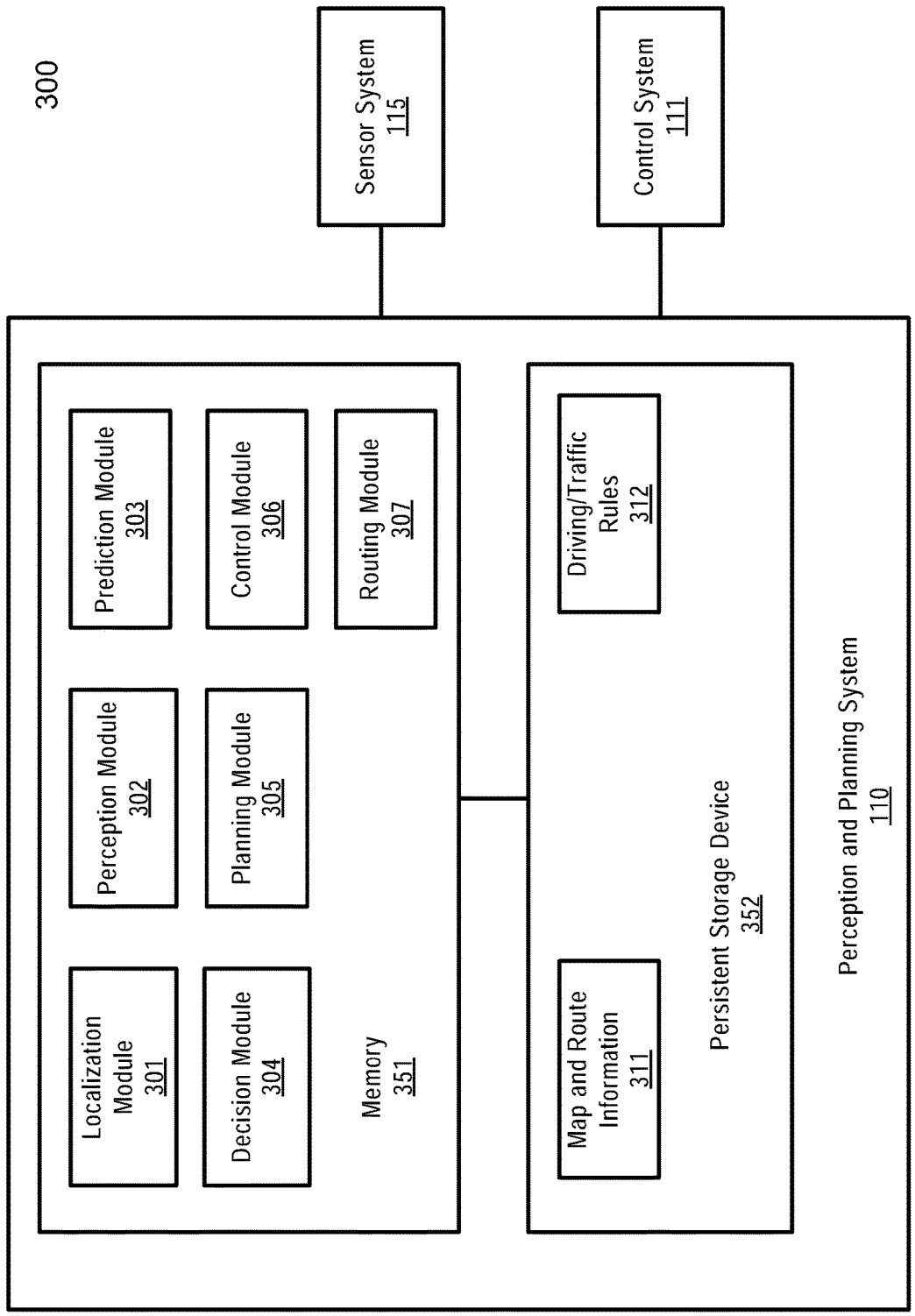
FIGS. 3A-3B are block diagrams illustrating an example of a perception and planning system used with an autonomous vehicle according to one embodiment.
Figure 3B:
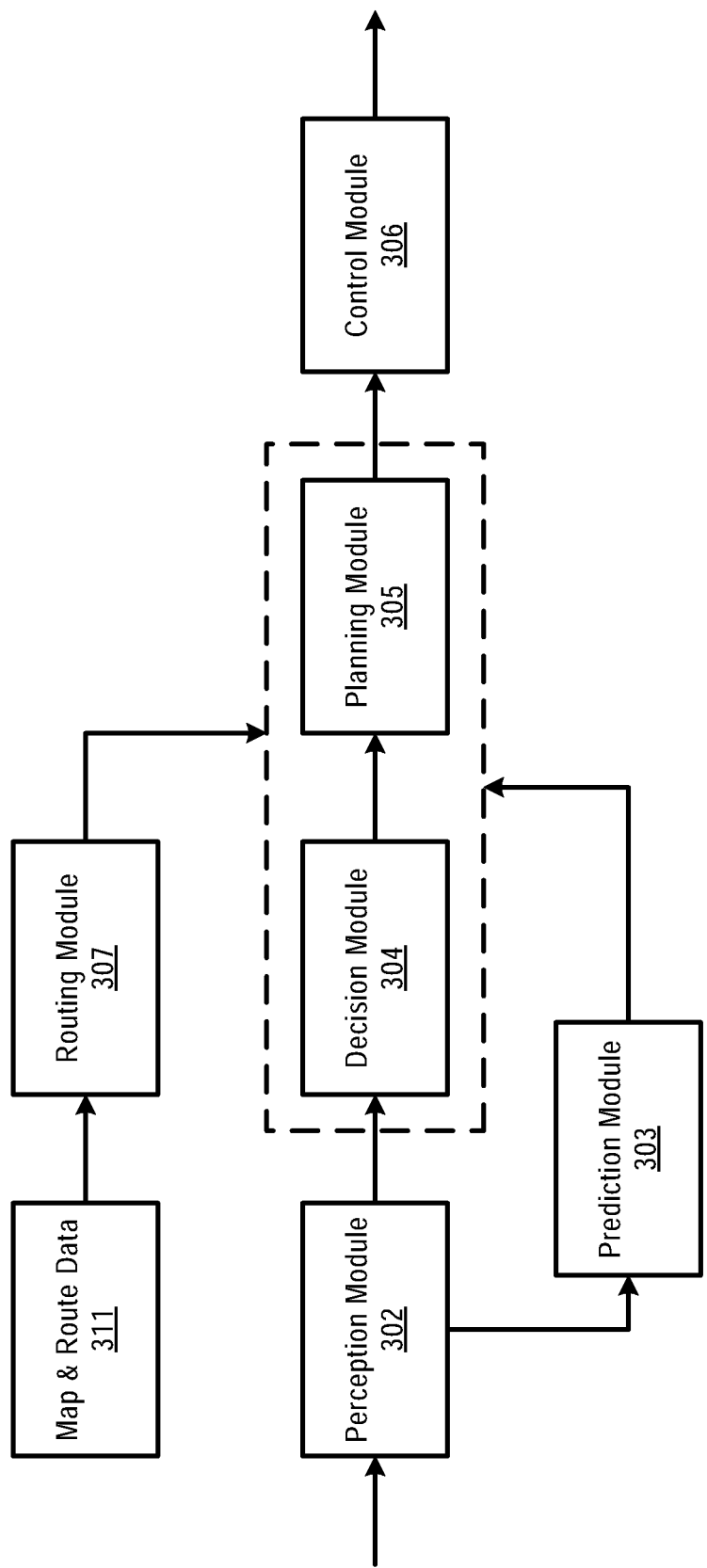

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Figure 4:
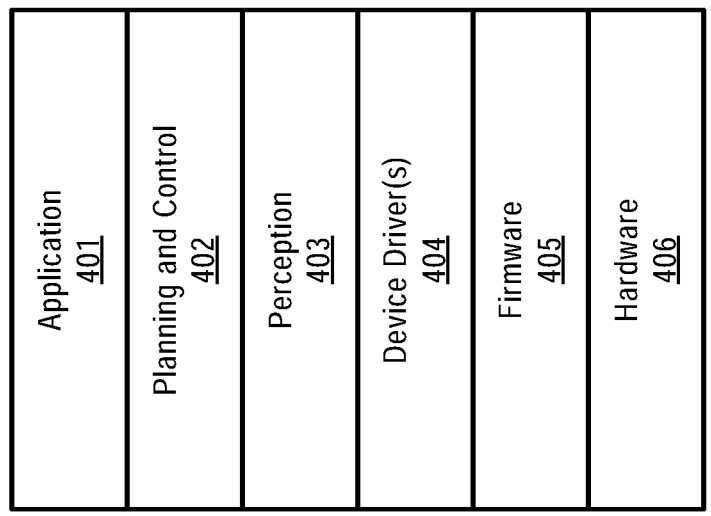
FIG. 4 is a block diagram illustrating architecture of an autonomous driving system according to one embodiment.

FIG. 4 is a block diagram illustrating system architecture for autonomous driving according to one embodiment. System architecture 400 may represent system architecture of an autonomous driving system as shown in FIGS. 3A and 3B. Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403. System architecture 400 further includes driver layer 404, firmware layer 405, and hardware layer 406. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

Figure 5A:
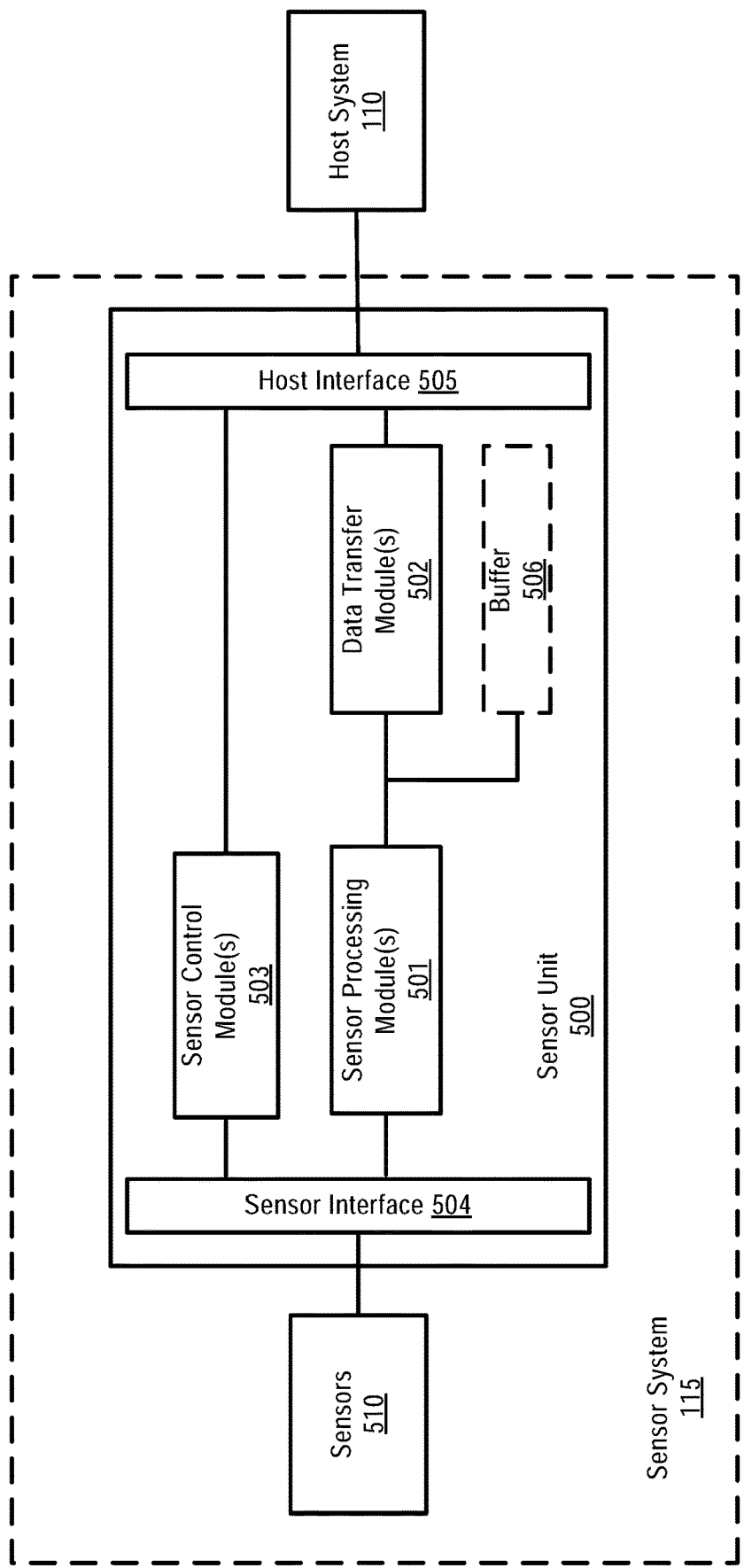
FIGS. 5A and 5B are block diagrams illustrating an example of a sensor unit according to one embodiment.

FIG. 5A is a block diagram illustrating an example of a sensor system according to one embodiment of the invention. Referring to FIG. 5A, sensor system 115 includes a number of sensors 510 and a sensor unit 500 coupled to host system 110. Host system 110 represents a planning and control system as described above, which may include at least some of the modules as shown in FIGS. 3A and 3B. Sensor unit 500 may be implemented in a form of an FPGA device or an ASIC (application specific integrated circuit) device. In one embodiment, sensor unit 500 includes, amongst others, one or more sensor data processing modules 501 (also simply referred to as sensor processing modules), data transfer modules 502, and sensor control modules or logic 503. Modules 501-503 can communicate with sensors 510 via a sensor interface 504 and communicate with host system 110 via host interface 505. Optionally, an internal or external buffer 506 may be utilized for buffering the data for processing.

In one embodiment, for the receiving path or upstream direction, sensor processing module 501 is configured to receive sensor data from a sensor via sensor interface 504 and process the sensor data (e.g., format conversion, error checking), which may be temporarily stored in buffer 506. Data transfer module 502 is configured to transfer the processed data to host system 110 using a communication protocol compatible with host interface 505. Similarly, for the transmitting path or downstream direction, data transfer module 502 is configured to receive data or commands from host system 110. The data is then processed by sensor processing module 501 to a format that is compatible with the corresponding sensor. The processed data is then transmitted to the sensor.

In one embodiment, sensor control module or logic 503 is configured to control certain operations of sensors 510, such as, for example, timing of activation of capturing sensor data, in response to commands received from host system (e.g., perception module 302) via host interface 505. Host system 110 can configure sensors 510 to capture sensor data in a collaborative and/or synchronized manner, such that the sensor data can be utilized to perceive a driving environment surrounding the vehicle at any point in time.

Sensor interface 504 can include one or more of Ethernet, USB (universal serial bus), LTE (long term evolution) or cellular, WiFi, GPS, camera, CAN, serial (e.g., universal asynchronous receiver transmitter or UART), SIM (subscriber identification module) card, and other general purpose input/output (GPIO) interfaces. Host interface 505 may be any high speed or high bandwidth interface such as PCIe (peripheral component interconnect or PCI express) interface. Sensors 510 can include a variety of sensors that are utilized in an autonomous driving vehicle, such as, for example, a camera, a LIDAR device, a RADAR device, a GPS receiver, an IMU, an ultrasonic sensor, a GNSS (global navigation satellite system) receiver, an LTE or cellular SIM card, vehicle sensors (e.g., throttle, brake, steering sensors), and system sensors (e.g., temperature, humidity, pressure sensors), etc.

For example, a camera can be coupled via an Ethernet or a GPIO interface. A GPS sensor can be coupled via a USB or a specific GPS interface. Vehicle sensors can be coupled via a CAN interface. A RADAR sensor or an ultrasonic sensor can be coupled via a GPIO interface. A LIDAR device can be coupled via an Ethernet interface. An external SIM module can be coupled via an LTE interface. Similarly, an internal SIM module can be inserted onto a SIM socket of sensor unit 500. The serial interface such as UART can be coupled with a console system for debug purposes.

Note that sensors 510 can be any kind of sensors and provided by various vendors or suppliers. Sensor processing module 501 is configured to handle different types of sensors and their respective data formats and communication protocols. According to one embodiment, each of sensors 510 is associated with a specific channel for processing sensor data and transferring the processed sensor data between host system 110 and the corresponding sensor. Each channel includes a specific sensor processing module and a specific data transfer module that have been configured or programmed to handle the corresponding sensor data and protocol, as shown in FIG. 5B.

Figure 5B:
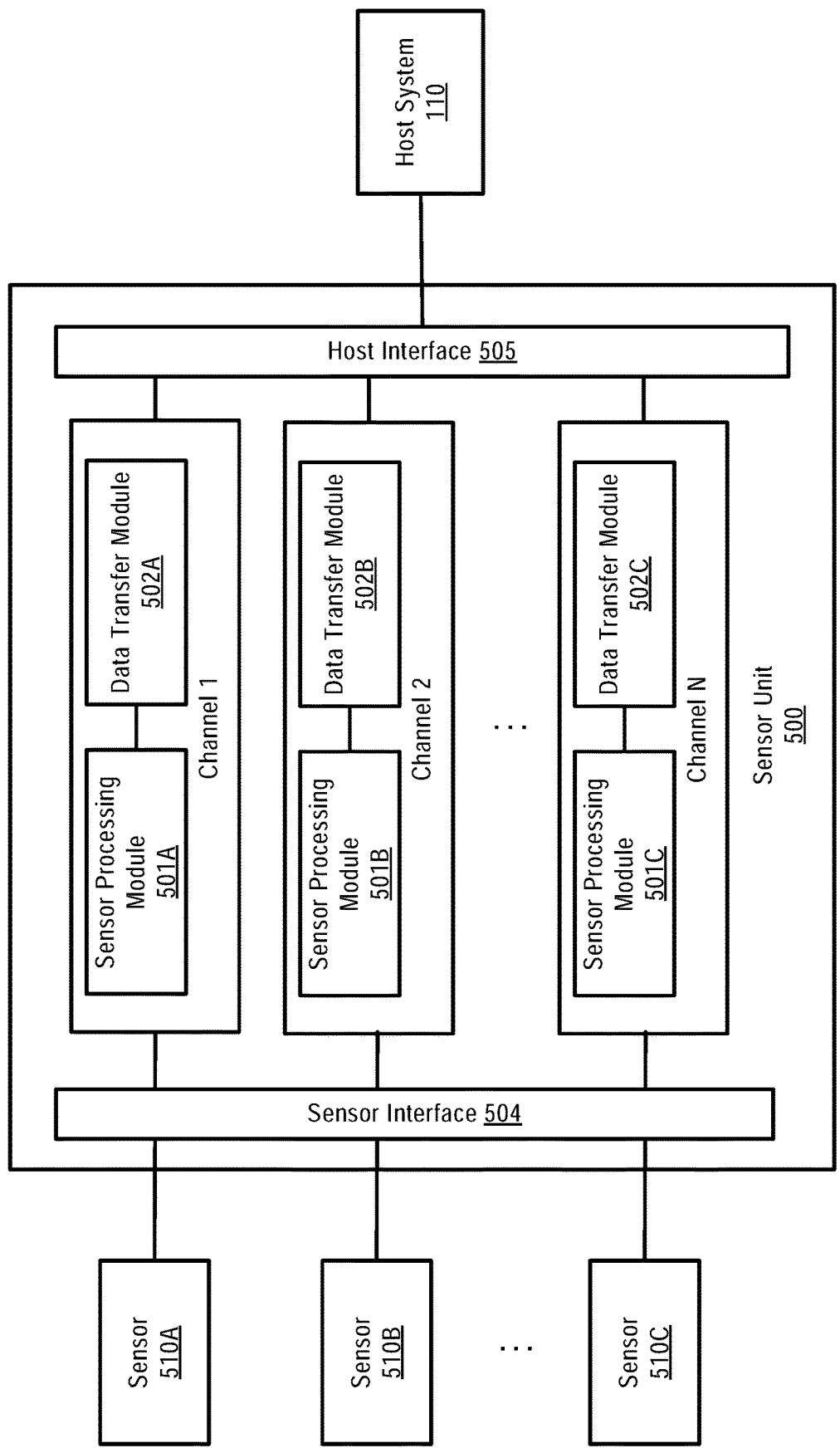

Referring now to FIG. 5B, sensor processing modules 501A-501C are specifically configured to process sensor data obtained from sensors 510A-510C respectively. Note that sensors 510A-510C may the same or different types of sensors. Sensor processing modules 501A-501C can be configured (e.g., software configurable) to handle different sensor processes for different types of sensors. For example, if sensor 510A is a camera, processing module 501A can be figured to handle pixel processing operations on the specific pixel data representing an image captured by camera 510A. Similarly, if sensor 510A is a LIDAR device, processing module 501A is configured to process LIDAR data specifically. That is, according to one embodiment, dependent upon the specific type of a particular sensor, its corresponding processing module can be configured to process the corresponding sensor data using a specific process or method corresponding to the type of sensor data.

Similarly, data transfer modules 502A-502C can be configured to operate in different modes, as different kinds of sensor data may be in different size or sensitivities that require different speed or timing requirement. According to one embodiment, each of data transfer modules 502A-502C can be configured to operate in one of a low latency mode, a high bandwidth mode, and a memory mode (also referred to as a fixed memory mode).

When operating in a low latency mode, according to one embodiment, a data transfer module (e.g., data transfer module 502) is configured to send the sensor data received from a sensor to the host system as soon as possible without or with minimum delay. Some of sensor data are very sensitive in terms of timing that need to be processed as soon as possible. Examples of such sensor data include vehicle status such as vehicle speed, acceleration, steering angle, etc.

When operating in a high bandwidth mode, according to one embodiment, a data transfer module (e.g., data transfer module 502) is configured to accumulate the sensor data received from a sensor up to a predetermined amount, but is still within the bandwidth the connection between the data transfer module and the host system 110. The accumulated sensor data is then transferred to the host system 110 in a batch that maximum the bandwidth of the connection between the data transfer module and host system 110. Typically, the high bandwidth mode is utilized for a sensor that produces a large amount of sensor data. Examples of such sensor data include camera pixel data.

When operating in a memory mode, according to one embodiment, a data transfer module is configured to write the sensor data received from a sensor directly to a memory location of a mapped memory of host system 110, similar to a shared memory page. Examples of the sensor data to be transferred using memory mode include system status data such as temperature, fans speed, etc.

Point Cloud Data Storage

Figure 6:
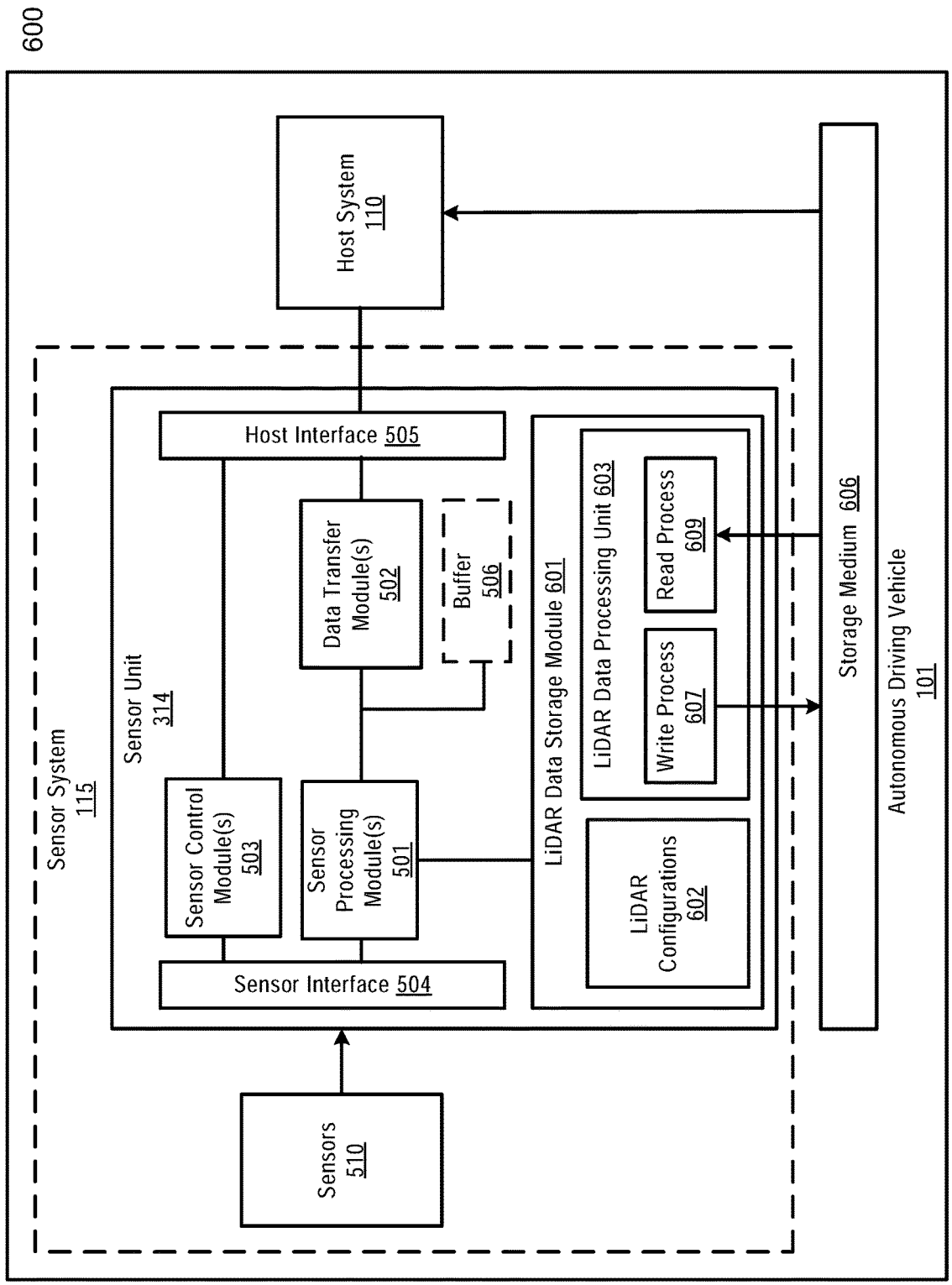
FIG. 6 illustrates an example system for storing point cloud data according to one embodiment.

FIG. 6 illustrates an example system for storing point cloud data according to one embodiment.

As described above, the sensor processing module 501 can preprocess raw point cloud data received from a LiDAR sensor, including format conversion and error checking. The sensor processing module 501 can invoke a LiDAR data storage module 601 to convert the raw LiDAR data from one format to another. In one example, the LiDAR data storage module 603 can convert the raw point cloud data into a user-defined storage format and store the converted point cloud data to a storage medium 606.

As shown in FIG. 6, the LiDAR data storage module 601 can include configuration information 602 for the LiDAR sensor; and a hardware-based data processing unit 603, which can be programmed to write the raw point cloud data in the user-defined storage format to the storage medium 603, and to read the stored point cloud data from the storage medium 603. A write process 607 and a read process 609 can be respectively provided in the LiDAR data processing unit 603 to perform the writing and the reading.

In one embodiment, the user-defined storage format can be a bitwise vector, with a flexible size. The size of the vector can be determined based on hardware properties of the LiDAR sensor, e.g., calibration data and accuracy measurements of the LiDAR sensor. The hardware properties of the LiDAR sensors can be included in the LiDAR configurations 602, and can be provided to the write process 607 for use in creating vectors for storing raw point cloud data.

In one embodiment, multiple vectors of the same size can be created, with each vector storing raw point cloud data acquired in response to laser beams emitted at a different horizontal angle.

In one embodiment, the LiDAR sensor can be of one of a variety of types. Each type of LiDAR sensor can have a different a different number of vertical firing planes (i.e. emitter/receiver pairs), with each vertical firing plane emitting and receiving a laser line at a particular vertical angle. In one example, the LiDAR sensor can be a 4-line sensor, which can generate images of lower resolution; or a 240-line sensor, which can generate images of much higher resolution.

In one embodiment, point cloud data can include cloud data points, with each cloud data point represented by a number of attributes. For example, a cloud data point can have attributes of x, y, z, i, and t, with x representing the x coordinate of the cloud data point, y representing the y coordinate of the cloud data point, z representing the z coordinate of the cloud data point, i representing intensity of the cloud data point, and t representing an acquisition time of the cloud data point. The x, y and z values can be in world coordinates and in a 32-digit floating-point numbers, the value of i can be a 16-digit or 8-digit integer, and the value of t can be a double number. Other attributes of the cloud data point can include red, green and blue (RGB) color attributes, each of which can be a floating point number with a range from 0.0 to 1.0 or an integer with a range from 0 to 255.

In one embodiment, when receiving raw point cloud data, the LiDAR data processing unit 603 can retrieve the configuration information 602 of the LiDAR sensor, and create one or more vectors, each vector including a number of data segments and a metadata segment. The number of data segments and the bit width of one or more fields in a data segment can be determined using a predetermined algorithm based on the configuration information 602, which can include the number of lines of the LiDAR sensor, the range of the LiDAR sensor, and calibration data of the LiDAR sensor.

For example, if the configuration information 602 of the LiDAR sensor describes that the LiDAR sensor is a 4-line sensor, the write process 607 can invoke the predetermined algorithm to create a vector with 4 data segments and one metadata segment. Each data segment can be an object with multiple fields. The number of fields in each data segment can be equal to the number of attributes which are to be stored for a cloud data point. Further, the bit width of one or more fields in each data segment can also depend on the configuration information 602 of the LiDAR sensor.

Therefore, a vector created to store cloud data points from a 4-line LiDAR sensor would have a smaller size than a vector created to store cloud data points from a 128-line LiDAR sensors. In addition, some fields in a data segment of the vector created to store cloud data points from a 4-line LiDAR sensor may have a narrower bit width than corresponding fields in a data segment of a vector created to store cloud data points from a 128-line LiDAR sensor.

In one embodiment, the algorithm used to determine the size of a vector and the bit width of one or more fields in a data segment of the vector can be represented by a neural network model trained on historical LiDAR data. The trained neural network model can determine a smallest bit width possible for a field in a data segment of a vector, without sacrificing the representation precision of the measurement stored in the field.

As further shown in FIG. 6, cloud point data stored in the storage medium 606 can be retrieved by the read process 609 for use by other functions of the autonomous driving vehicle. In one example, the cloud point data can be retrieved by the host system 110 using a process similar to the read process 609, and can be used functions such as route planning and vehicle localization.

Figure 7:
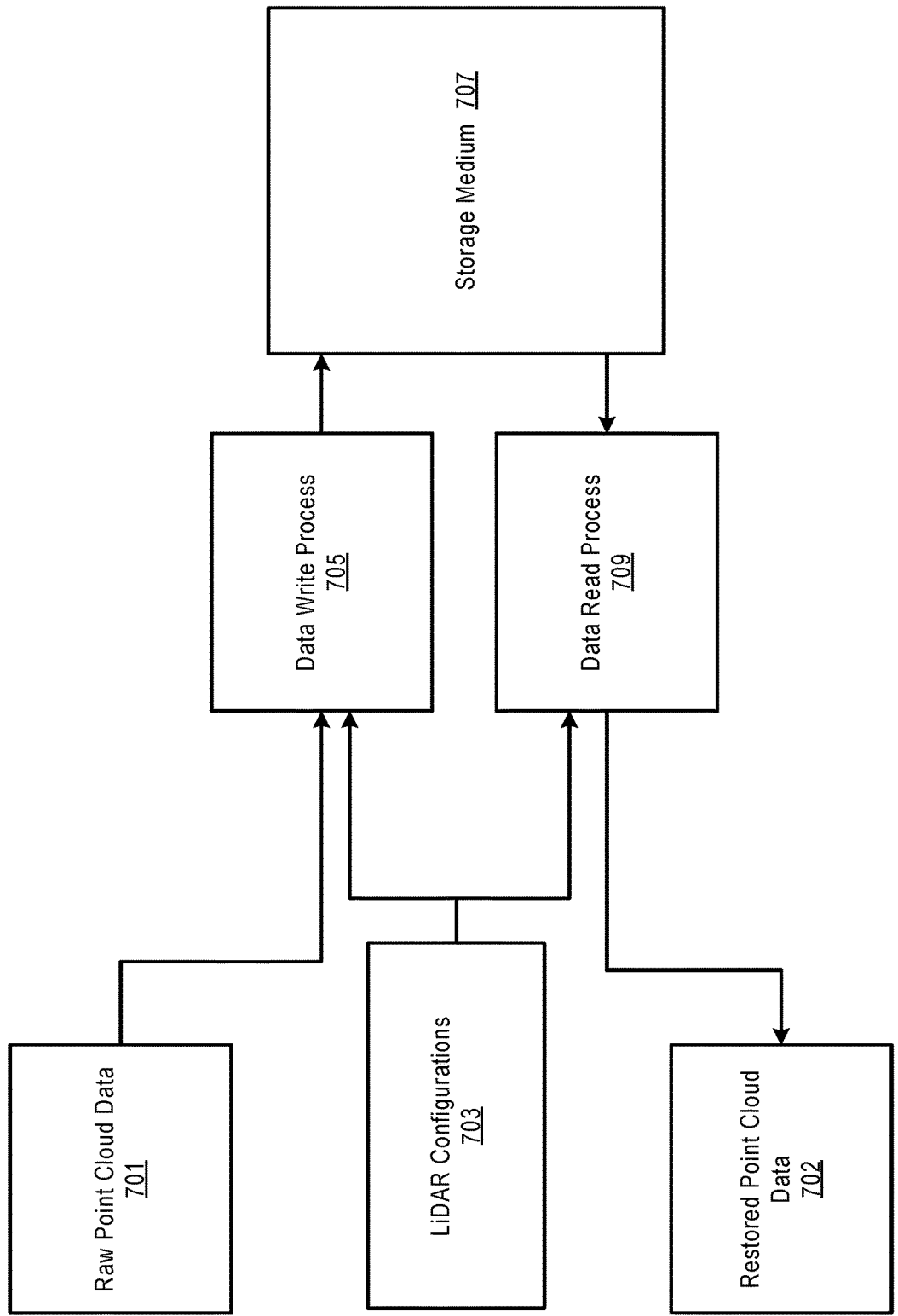
FIG. 7 is a data flow diagram illustrating an example process of storing point cloud data according to one embodiment.

FIG. 7 is a data flow diagram illustrating an example process of storing point cloud data according to one embodiment. In this example diagram, a data write process 705 and a data read process 709 can both be functions implemented in hardware. The data write process 705 can load configuration information 703 of a LiDAR sensor, from which raw point cloud data 701 is to be stored by the data write process 705 to a storage medium 707.

In one embodiment, the configuration information 703 can include a number of hardware properties of the LiDAR sensor and calibration data. Examples of the hardware properties can include a number of laser lines, and a range of the LiDAR sensor. Examples of calibration data can include a rotation speed of the LiDAR sensor, a rotation angle between scans, a vertical field of view, and a horizontal field of view.

Based on the loaded configuration information 703 of the LiDAR sensor, the data write process 705 can create multiple data structures to store the raw point cloud data. Each data structure can be a bitwise vector, the size of which can be determined based on one or more properties of the hardware properties and/or calibration data as described in the configuration information 703.

Each vector can include multiple data entries and at least one metadata entry. A data entry can be a data segment represented by an object. The number of of fields in the object can be equal to the number of attributes collected for a cloud data point. Each field in a data entry can be optimized at a bit level to reduce storage space based on the one or more properties of the hardware properties and/or calibration data. The data write process 705 can store the raw point cloud data to the storage medium 707 using one or more such vectors. The data read process 707 can read the stored point cloud data and restore the data to a standard point cloud format 702.

Figure 8A:
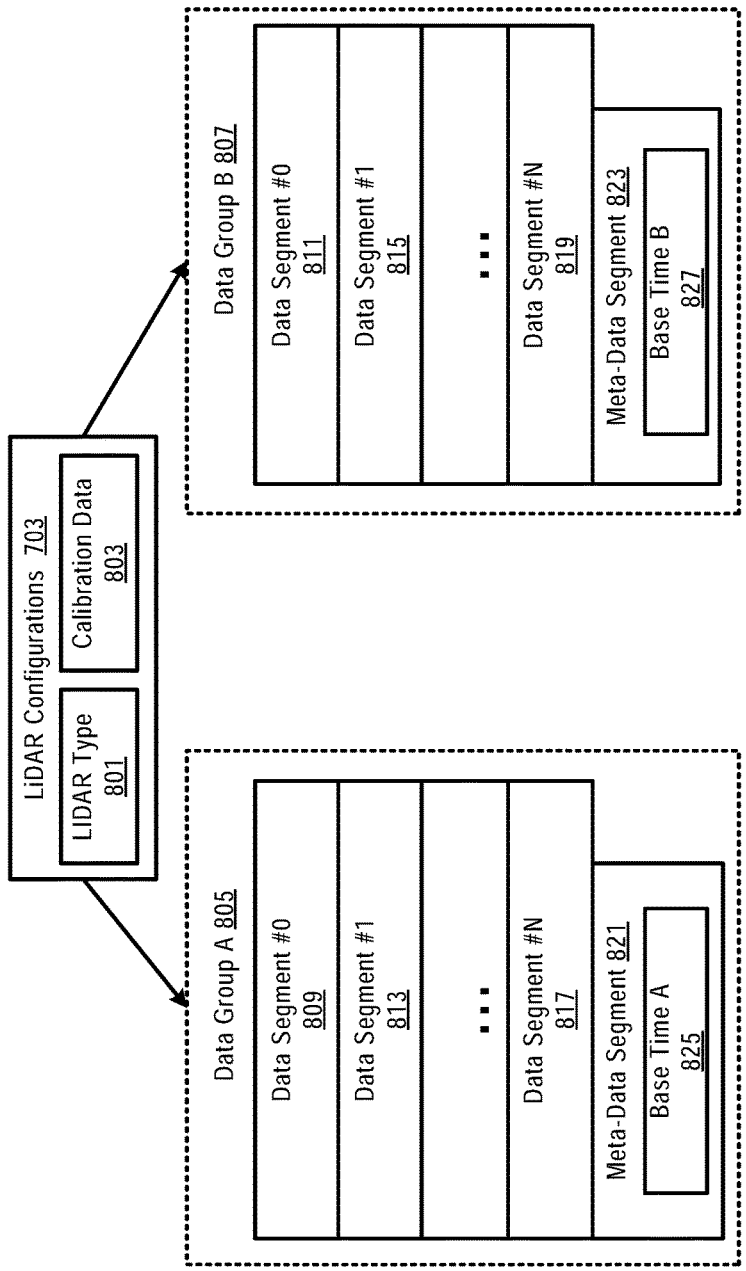
FIGS. 8A-8B illustrate an example point cloud data storage format according to one embodiment.
Figure 8B:
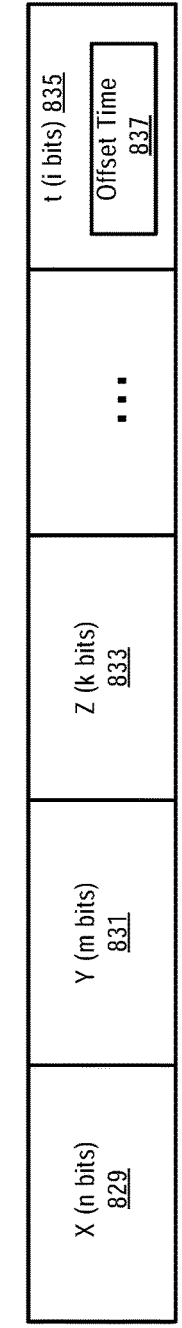

FIGS. 8A-8B illustrate an example point cloud data storage format according to one embodiment.

In FIG. 8A, data group A 805 and data group B 807 can both be vectors. Each data group can store point clouds acquired by a LiDAR sensor in response to laser beams emitted at a given horizontal angle. The number of data segments in each vector can be based on one or more hardware properties stored in a LiDAR configuration file 703. The hardware properties can include a type 801 of the LiDAR sensor and calibration data 803 of the LiDAR sensor. The type of the LiDAR sensor can have associated data such as the laser lines and the detection range of the LiDAR sensor.

As shown in FIG. 8A, data group A 805 can include data segments 809, 813 and 817, and data group B 807 can include data segment 811, 815 and 819. Each data segment can be an object with a number of fields for storing attributes of a cloud data point. Each data group can also include metadata segment for storing information to be shared by the data segments in the data group.

For example, a metadata segments 821 in data group A 805 can include a base time A 825 to be shared by the data segments 809, 813 and 817 in the data group 805, while a metadata segment 823 in the data group B 807 can include a base time B 827 to be shared by the data segments 811, 815 and 819 in the data group 807.

In one embodiment, with the base time in each data group, each data segment in the data group need only store an offset time for the corresponding cloud data point. The base time and the offset time can be combined to calculate the actual timestamp of the corresponding cloud data point. Storing offset times instead of the whole timestamps in a data segment can reduce the requirement for a larger bit width for the timestamp field, thereby saving storage space.

The LiDAR configurations 703 can be used to determine the size of each of the vectors 805 and 807, and the bit widths of one or more fields of a data segment in the vector. Therefore, instead of using a fixed-sized data structure to store cloud data points for all types of LiDAR sensors, the size of data group A 805 and data group B 807 can be dynamically adjusted based on the hardware properties of the LiDAR sensor, from which point cloud data is to be stored.

FIG. 8B illustrates an example data segment in a vector. The example data segment 828 can include a number of fields to store attributes of a cloud data point, such as fields 829, 831 and 833 to respectively store the x, y and z coordinates of the cloud data point; and a timestamp field 835 to a time offset 837, which can be used to calculate the actual acquisition timestamps of the cloud data point in conjunction with one of the base times 825 and 827 as previously described in FIG. 8A.

Further, the bit width of one or more fields in a data segment can also by dynamically determined by the hardware properties of the LiDAR sensor. In one example, the bit width of one or more fields in a data segment in a vector is inversely proportional to the number of the laser lines of the LiDAR sensor. The higher the resolution of the LiDAR sensor, the narrower the bit width used to store a given attribute of a cloud data point of the LiDAR sensor. Therefore, the bit width of each of the fields 825, 831 and 833 can be smaller for a cloud data point from a 128-line LiDAR sensor than for a 4-line LiDAR sensor.

Figure 9:
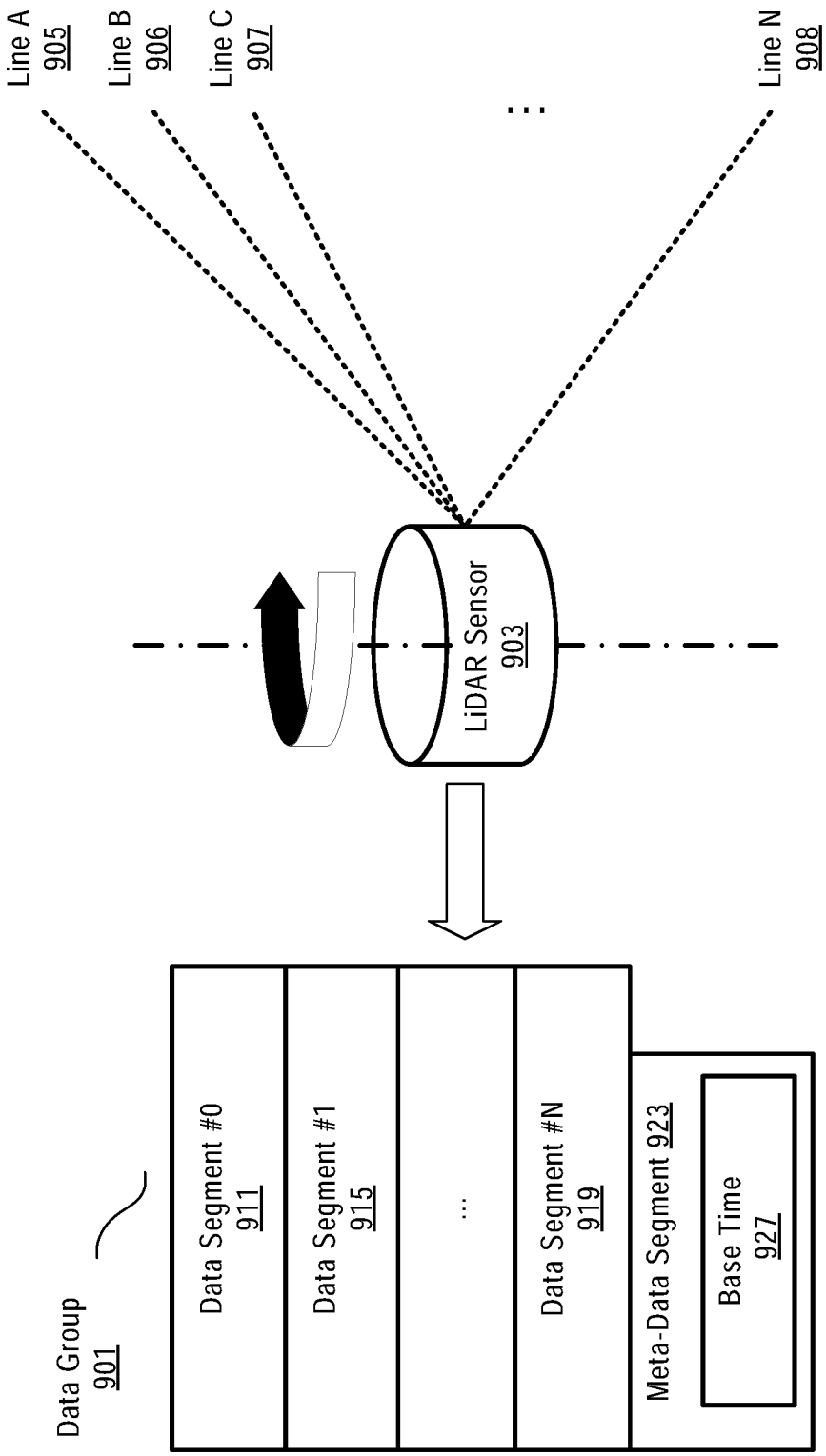
FIG. 9 illustrates an example data group in view of laser lines of a LiDAR sensor according to one embodiment.

FIG. 9 illustrates an example data group 901 in view of laser lines of a LiDAR sensor according to one embodiment.

As shown in FIG. 9, a LiDAR sensor 903 can emit a number of laser beams (i.e., laser lines) 905, 906, 907, and 908 at a given horizontal angle. Each laser beams can be emitted at a different vertical angle at the given horizontal angle. Cloud data points can be generated by these laser beams when hitting a target object, and can be captured by the LiDAR sensor 903.

To store the captured cloud data points, the vector-based data group 901 can be created to include a number of data segments 911,915 and 919. The number of the data segments can be equal to the number of laser lines of the LiDAR sensor 903. The number of laser lines can also partially determine the bit width of one or more fields in each data segment. The flexible bitwise vector can enable a write process (e.g., the data write process in FIG. 7) to store the captured cloud data points without wasting storage space.

In one embodiment, in conjunction with a time offset stored in each data segment in the data group 901, a base time 927 in a metadata segment 923 can be used to calculate an acquisition timestamp for each cloud data point. The base time 927 can be an acquisition time of a first cloud data point captured at the given horizontal angle.

For example, if a cloud data point generated by laser line B 906 is the first cloud data point captured by the LiDAR sensor from the given horizontal direction, the timestamp of the cloud data point can be used as the base time 927, and can be stored in the metadata segment 923. An offset time, which is 0 in this instance, can be stored in the data segment #1 915. Other attributes (e.g., coordinates and intensity) of the cloud data point can also be stored in the data segment #1 915.

When a cloud data point generated from another laser line (e.g., laser line A 905) is captured, an offset time can be calculated by subtracting the base time 927 from the acquisition time of the cloud data point, and can be stored in the data segment #0 911. Similarly, other attributes of the cloud data point can be stored in the data segment #0 911.

When a cloud data point has been captured from each laser line and the data group 901 has been completely filled, the write process can write the data group to a storage medium. The data group 901 can be repeatedly used to store additional cloud data points from the given horizontal angle, and from one or more other horizontal angles.

Figure 10:
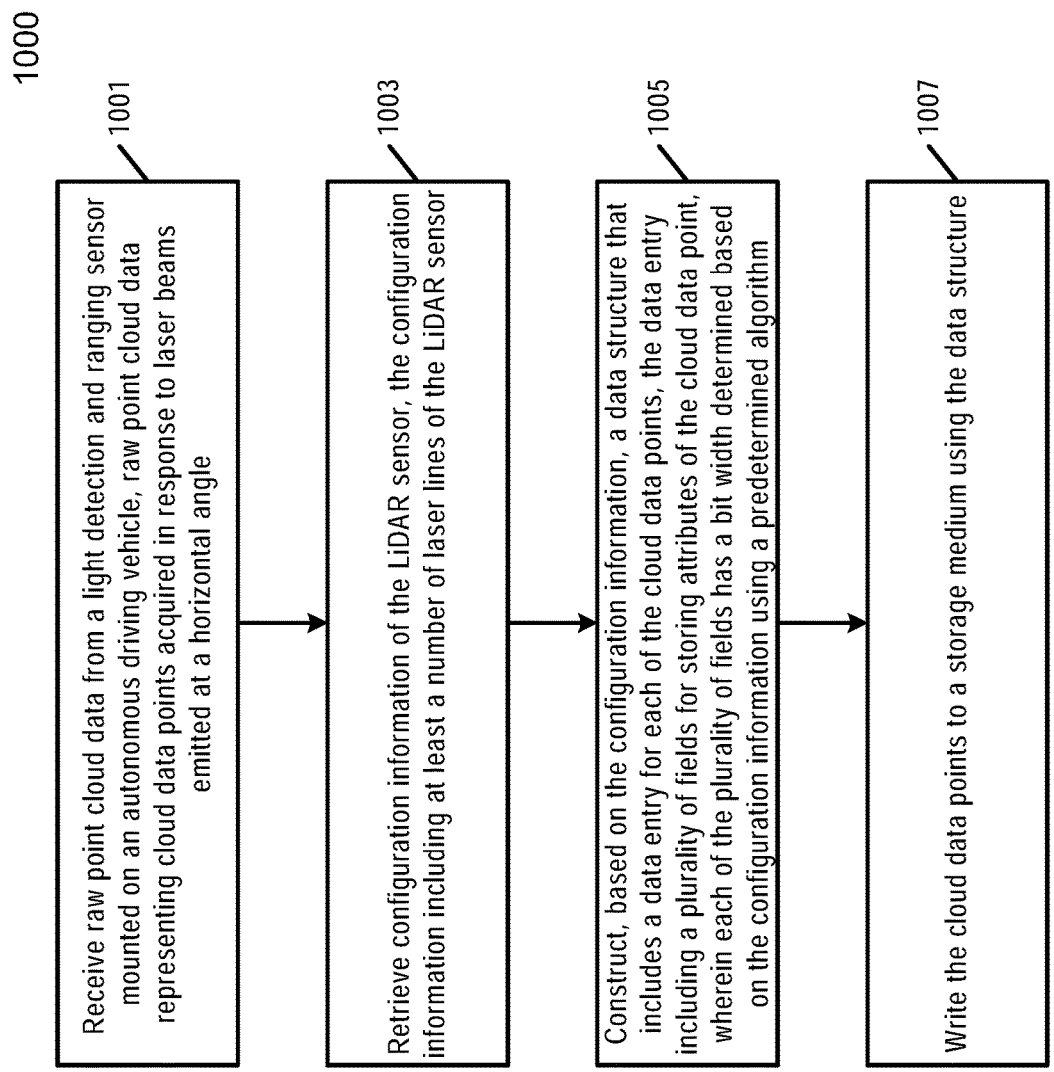
FIG. 10 illustrates an example process of storing point cloud data in an autonomous driving vehicle according to one embodiment.

FIG. 10 illustrates an example process 1000 of storing point cloud data in an autonomous driving vehicle according to one embodiment. Process 1000 may be performed by processing logic which may include software, hardware, or a combination thereof. For example, process 1000 may be performed by the LIDAR data storage module 601 described in FIG. 6.

Referring back to FIG. 10, in operation 1001, the processing logic receives raw point cloud data from a LiDAR sensor mounted on an autonomous driving vehicle, the raw point cloud data representing cloud data points acquired in response to laser beams emitted at a horizontal angle. In operation 1003, the processing logic retrieves configuration information of the LiDAR sensor, the configuration information including at least a number of laser lines of the LiDAR sensor. In operation 1005, the processing logic constructs, based on the configuration information, a data structure that includes a data entry for each of the cloud data points, the data entry including a number of fields for storing attributes of the cloud data point, wherein each of the fields has a bit width determined based on the configuration information using a predetermined algorithm. In operation 1007, the processing logic writes the cloud data points to a storage medium using the data structure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of processing point cloud data for an autonomous driving vehicle (ADV), comprising:

receiving raw point cloud data from a light detection and ranging (LiDAR) sensor mounted on the ADV, wherein the raw point cloud data represents cloud data points acquired by the LiDAR sensor in response to laser lines emitted at a horizontal direction;

retrieving configuration information of the LiDAR sensor, wherein the configuration information includes a number of the laser lines emitted at the horizontal direction, each of the number of laser lines corresponding to a vertical angle with respect to the ground;

constructing a data structure that includes a plurality of data entries, wherein each of the plurality of data entries stores each of the cloud data points and includes a plurality of data fields, each data field being configured with a bit width determined based on the configuration information of the LiDAR sensor, wherein a bit width of at least one of the plurality of data fields is inversely proportional to the number of the laser lines emitted at the horizontal direction; and writing the cloud data points contained in the data structure to a storage medium, wherein the stored cloud data points are utilized to perceive a driving environment surrounding the ADV.

2. The method of claim 1, wherein the data structure further includes a metadata entry to store at least one attribute of the cloud data point.

3. The method of claim 2, wherein the metadata entry includes a base time for a timestamp attribute of the cloud data point, wherein each of the plurality of data entries in the data structure includes a timestamp field to store an offset time relative to the base time, and wherein the offset time in combination with the base time is used to determine absolute time at which the corresponding cloud data point was captured.

4. The method of claim 1, wherein the data structure comprises a plurality of groups, each group including a plurality of data entries associated with the group, wherein the data structure further comprises a global configuration header shared by the plurality of groups, and wherein the global configuration header stores the configuration information of the LiDAR sensor.

5. The method of claim 4, wherein the global configuration header comprises information indicating the type of the LiDAR sensor and the number of laser lines of the LiDAR sensor.

6. The method of claim 4, wherein each of the plurality of groups further includes a metadata entry to store metadata of the group that is shared by the plurality of data entries associated with the group.

7. The method of claim 6, wherein the metadata of the group comprises a base timestamp representing a time period within which cloud data points of the plurality of data entries of the group were captured.

8. The method of claim 7, wherein each data entry of the group further includes an offset timestamp representing a time offset with respect to the base timestamp contained in the metadata entry of the group, and wherein the offset timestamp in combination with the base timestamp are utilized to determine an absolute time at which a cloud data point corresponding to the data entry was captured.

9. The method of claim 1, wherein the configuration information further includes calibration information of the LiDAR sensor.

10. A non-transitory machine-readable medium having instructions stored therein for storing point cloud data in an autonomous driving vehicle (ADV), which instructions, when executed by a processor of the ADV, cause the processor to perform operations, the operations comprising:

receiving raw point cloud data from a light detection and ranging (LiDAR) sensor mounted on the ADV, wherein the raw point cloud data represents cloud data points acquired by the LiDAR sensor in response to laser lines emitted at a horizontal direction;

retrieving configuration information of the LiDAR sensor, wherein the configuration information includes a number of the laser lines emitted at the horizontal direction, each of the number of laser lines corresponding to a vertical angle with respect to the ground;

constructing a data structure that includes a plurality of data entries, wherein each of the plurality of data entries stores each of the cloud data points and includes a plurality of data fields, each data field being configured with a bit width determined based on the configuration information of the LiDAR sensor, wherein a bit width of at least one of the plurality of data fields is inversely proportional to the number of the laser lines emitted at the horizontal direction; and writing the cloud data points contained in the data structure to a storage medium, wherein the stored cloud data points are utilized to perceive a driving environment surrounding the ADV.

11. The non-transitory machine-readable medium of claim 10, wherein the data structure further includes a metadata entry to store at least one attribute of the cloud data point.

12. The non-transitory machine-readable medium of claim 11, wherein the metadata entry includes a base time for a timestamp attribute of the cloud data point, wherein each of the plurality of data entries in the data structure includes a timestamp field to store an offset time relative to the base time, and wherein the offset time in combination with the base time is used to determine absolute time at which the corresponding cloud data point was captured.

13. The non-transitory machine-readable medium of claim 10, wherein the data structure comprises a plurality of groups, each group including a plurality of data entries associated with the group, wherein the data structure further comprises a global configuration header shared by the plurality of groups, and wherein the global configuration header stores the configuration information of the LiDAR sensor.

14. The non-transitory machine-readable medium of claim 13, wherein the global configuration header comprises information indicating the type of the LiDAR sensor and the number of laser lines of the LiDAR sensor.

15. The non-transitory machine-readable medium of claim 13, wherein each of the plurality of groups further includes a metadata entry to store metadata of the group that is shared by the plurality of data entries associated with the group.

16. The non-transitory machine-readable medium of claim 15, wherein the metadata of the group comprises a base timestamp representing a time period within which cloud data points of the plurality of data entries of the group were captured.

17. The non-transitory machine-readable medium of claim 16, wherein each data entry of the group further includes an offset timestamp representing a time offset with respect to the base timestamp contained in the metadata entry of the group, and wherein the offset timestamp in combination with the base timestamp are utilized to determine an absolute time at which a cloud data point corresponding to the data entry was captured.

18. A data processing system, comprising:

a processor; and a memory coupled to the processor to store instructions for storing point cloud data in an autonomous driving vehicle (ADV), which instructions, when executed by the processor, cause the processor to perform operations, the operations including receiving raw point cloud data from a light detection and ranging (LiDAR) sensor mounted on the ADV, wherein the raw point cloud data represents cloud data points acquired by the LiDAR sensor in response to laser lines emitted at a horizontal direction;

retrieving configuration information of the LiDAR sensor, wherein the configuration information includes a number of the laser lines emitted at the horizontal direction, each of the number of laser lines corresponding to a vertical angle with respect to the ground;

constructing a data structure that includes a plurality of data entries, wherein each of the plurality of data entries stores each of the cloud data points and includes plurality of data fields, each data field being configured with a bit width determined based on the configuration information of the LiDAR sensor, wherein a bit width of at least one of the plurality of data fields is inversely proportional to the number of the laser lines emitted at the horizontal direction; and writing the cloud data points contained in the data structure to a storage medium, wherein the stored cloud data points are utilized to perceive a driving environment surrounding the ADV.

19. The data processing system of claim 18, wherein the data structure further includes a metadata entry to store at least one attribute of the cloud data point.

20. The data processing system of claim 19, wherein the metadata entry includes a base time for a timestamp attribute of the cloud data point, wherein each of the plurality of data entries in the data structure includes a timestamp field to store an offset time relative to the base time, and wherein the offset time in combination with the base time is used to determine absolute time at which the corresponding cloud data point was captured.

* * * * *